(12) United States Patent
Shu et al.

(10) Patent No.: US 11,295,001 B2
(45) Date of Patent: Apr. 5, 2022

(54) SYMBOL INPUT METHOD AND SYMBOL INPUT DEVICE

(71) Applicant: PANASONIC INTELLECTUAL PROPERTY MANAGEMENT CO., LTD., Osaka (JP)

(72) Inventors: Keiyou Shu, Osaka (JP); Keijiroh Nagano, Osaka (JP); Keiji Mori, Osaka (JP); Hidekazu Tanaka, Kyoto (JP); Yoshiyuki Furuya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 411 days.

(21) Appl. No.: 16/527,949

(22) Filed: Jul. 31, 2019

(65) Prior Publication Data

US 2019/0354671 A1 Nov. 21, 2019

Related U.S. Application Data

(63) Continuation of application No. PCT/JP2017/003958, filed on Feb. 3, 2017.

(51) Int. Cl.
*H04L 9/32* (2006.01)
*G06F 21/36* (2013.01)
(Continued)

(52) U.S. Cl.
CPC ........ *G06F 21/36* (2013.01); *B64D 11/00151* (2014.12); *G06F 3/04895* (2013.01); *G07F 7/1008* (2013.01); *H04L 9/3226* (2013.01)

(58) Field of Classification Search
CPC ... H04L 9/3226; H04L 9/3228; H04L 63/083; G06F 21/36
See application file for complete search history.

(56) References Cited

U.S. PATENT DOCUMENTS

| 2005/0075973 | A1 | 4/2005 | Yousofi | |
| 2007/0089166 | A1* | 4/2007 | Medjitov | G06F 21/36 726/5 |

(Continued)

FOREIGN PATENT DOCUMENTS

| JP | H06-318186 A | 11/1994 |
| JP | 2004-507010 A | 3/2004 |

(Continued)

OTHER PUBLICATIONS

International Search Report and Written Opinion dated Mar. 7, 2017 in International Application No. PCT/JP2017/003958; with partial English translation.

*Primary Examiner* — Ali S Abyaneh
(74) *Attorney, Agent, or Firm* — McDermott Will & Emery LLP

(57) ABSTRACT

A symbol input method performed by a symbol input device having a display unit, a selector, and a determiner includes: displaying, by the display unit, a correspondence table indicating correspondences between input target symbols and selection target symbols and indicating that each of the input target symbols corresponds to one or more selection target symbols; ending the displaying by the display unit; prompting, by the selector, after the ending, a user to select one of the selection target symbols included in the displayed correspondence table; and determining, by the determiner, one input target symbol as a symbol to be input. The input target symbol is indicated in the displayed correspondence table and corresponds to the selection target symbol selected by the user in the prompting.

8 Claims, 6 Drawing Sheets

(51) Int. Cl.
*B64D 11/00* (2006.01)
*G06F 3/04895* (2022.01)
*G07F 7/10* (2006.01)

(56) References Cited

U.S. PATENT DOCUMENTS

| | | | |
|---|---|---|---|
| 2009/0165104 A1* | 6/2009 | Danielsen | G09C 1/00 |
| | | | 726/6 |
| 2010/0319057 A1 | 12/2010 | Murai et al. | |
| 2016/0034686 A1* | 2/2016 | Yin | G06F 21/31 |
| | | | 726/6 |
| 2017/0337368 A1* | 11/2017 | Sang | G06F 21/31 |

FOREIGN PATENT DOCUMENTS

| | | |
|---|---|---|
| JP | 2008-027413 A | 2/2008 |
| JP | 2008-234440 A | 10/2008 |
| JP | 2010-287160 A | 12/2010 |
| JP | 2014-32537 A | 2/2014 |
| JP | 2016-139188 A | 8/2016 |
| WO | 02/17556 A1 | 2/2002 |

* cited by examiner

SYMBOL INPUT METHOD AND SYMBOL INPUT DEVICE

CROSS REFERENCE TO RELATED APPLICATIONS

This application is a U.S. continuation application of PCT International Patent Application Number PCT/JP2017/003958 filed on Feb. 3, 2017.

BACKGROUND

1. Technical Field

The present disclosure relates to a symbol input method and a symbol input device for inputting symbol such as numbers and characters.

2. Description of the Related Art

Conventionally, a method of inputting symbols such as numbers and characters has been disclosed (refer to Japanese Unexamined Patent Application Publication No. 2016-139188, for example).

Symbols needed be kept secret from other people, such as the personal identification number of a credit card, are input in some cases.

The present disclosure is intended to provide a symbol input method and a symbol input device capable of reducing the probability that input symbols are determined by other people as compared to conventional cases.

SUMMARY

In accordance with an aspect of the present disclosure, there is provided a symbol input method performed by a symbol input device, the symbol input device including a display unit, a selector, and a determiner, the symbol input method including: displaying, by the display unit, a correspondence table indicating correspondences between a plurality of input target symbols and a plurality of selection target symbols, the correspondence table indicating that each of the plurality of input target symbols corresponds to one or more selection target symbols different from each other among the plurality of selection target symbols; ending, by the display unit, the display of the correspondence table; prompting, by the selector, after the ending, a user of the symbol input device to select one of the plurality of selection target symbols included in the correspondence table displayed in the displaying; and determining, by the determiner, one input target symbol as a symbol to be input, the one input target symbol being indicated in the correspondence table displayed in the displaying and corresponding to the one of the plurality of selection target symbols selected by the user in the prompting.

In accordance with another aspect of the present disclosure, there is provided a symbol input device, including: a display unit that (i) displays a correspondence table indicating correspondences between a plurality of input target symbols and a plurality of selection target symbols, the correspondence table indicating that each of the plurality of input target symbols corresponds to one or more selection target symbols different from each other among the plurality of selection target symbols, and (ii) ends the display of the correspondence table; a selector that prompts a user to select one of the plurality of selection target symbols included in the correspondence table displayed by the display unit after the display unit ends the display of the correspondence table; and a determiner that determines one input target symbol corresponding to the one of the plurality of selection target symbols selected by the user, the one input target symbol being indicated in the correspondence table displayed by the display unit.

According to the symbol input method and the symbol input device described above, the probability that input symbols are determined by other people can be reduced as compared to conventional cases.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
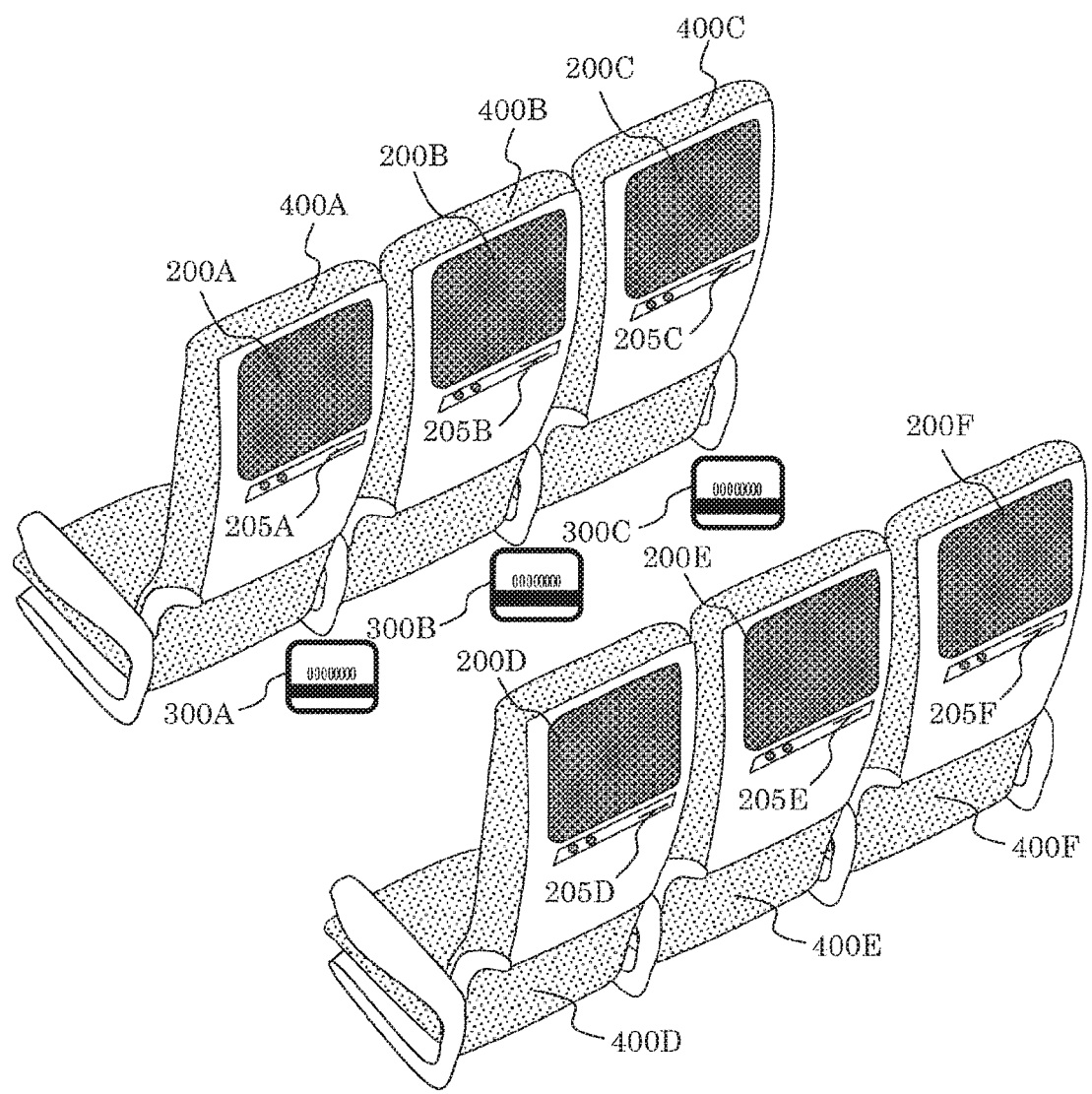
FIG. 1 is a perspective view illustrating disposition of an on-board monitor provided in an aircraft according to an embodiment.

In accordance with an aspect of the present disclosure, there is provided a symbol input method performed by a symbol input device, the symbol input device including a display unit, a selector, and a determiner, the symbol input method including: displaying, by the display unit, a correspondence table indicating correspondences between a plurality of input target symbols and a plurality of selection target symbols, the correspondence table indicating that each of the plurality of input target symbols corresponds to one or more selection target symbols different from each other among the plurality of selection target symbols; ending, by the display unit, the display of the correspondence table; prompting, by the selector, after the ending, a user of the symbol input device to select one of the plurality of selection target symbols included in the correspondence table displayed in the displaying; and determining, by the determiner, one input target symbol as a symbol to be input, the one input target symbol being indicated in the correspondence table displayed in the displaying and corresponding to the one of the plurality of selection target symbols selected by the user in the prompting.

According to the symbol input method configured as described above, display of the correspondence table is already ended when the user selects one of the selection target symbols.

With this configuration, for example, when the user is seen selecting one of the selection target symbols by a person, it is difficult for the person to know which input target symbol is determined as a symbol to be input.

Thus, according to the symbol input method configured as described above, the probability that input symbols are determined by other people can be reduced as compared to conventional cases.

Furthermore, it is possible that the displaying, the ending, the prompting, and the determining are repetitively executed N times to determine N symbols to be input, where N is an integer equal to or larger than two, and that in the displaying, the correspondence table so that the correspondence tables between which the correspondences are not necessarily identical are displayed at the repetitive executions in the displaying.

Accordingly, N symbols can be input.

It is also possible that the prompting includes, displaying, by the display unit, each of the plurality of selection target symbols included in the correspondence table displayed in the displaying.

Accordingly, the user can visually recognize each of the plurality of selection target symbols.

It is further possible that each of the plurality of input target symbols is any of one numeric character and one alphabetical character, and that each of the plurality of selection target symbols is a figure other than a numeric character and an alphabetical character.

Accordingly, any of one numeric character and one alphabetical character can be input.

It is still further possible that the symbol input device is disposed in a transport means that transports a passenger, that the symbol input device further includes an interruption processor, and that the symbol input method further includes: interrupting, by the interruption processor, at least one of the displaying, the ending, the prompting, and the determining, when announcement for the passenger is to be started in the transport means while the at least one of the displaying, the ending, the prompting, and the determining is being executed by the symbol input device.

Accordingly, when announcement is started in the transport means while the user is inputting a symbol, the user inevitably stops the symbol inputting.

As a result, the user can focus on the announcement.

It is still further possible that the symbol input method includes: resuming, by the interruption processor, the at least one of the displaying, the ending, the prompting, and the determining interrupted in the interrupting and being interrupted, when a predetermined condition is satisfied.

Accordingly, when the predetermined condition is satisfied, the user can resume the symbol inputting interrupted by the started announcement.

It is still further possible that the symbol input method further includes: in a case where the displaying, the ending, the prompting, and the determining are scheduled to be repetitively executed N times in the symbol input device and the repetitive execution is completed up to a K-th execution, where N is an integer equal to or larger than two and K is an integer equal to or larger than one and smaller than N, when the predetermined condition is satisfied in the interrupting by the interruption processor, resuming, by the interruption processor, the repetitive execution from start of a (K+1)-th execution in the repetitive execution.

Accordingly, when the predetermined condition is satisfied, the user can resume the N-symbol inputting interrupted by the started announcement from inputting of the (K+1)-th symbol.

It is still further possible that the symbol input method further includes: in a case where the displaying, the ending, the prompting, and the determining are scheduled to be repetitively executed N times in the symbol input device and the repetitive execution is completed up to a K-th execution, where N is an integer equal to or larger than two and K is an integer equal to or larger than one and smaller than N, when the predetermined condition is satisfied in the interrupting by the interruption processor, resuming, by the interruption processor, the repetitive execution from start of a first execution among the repetitive execution.

Accordingly, when the predetermined condition is satisfied, the user can resume the N-symbol inputting interrupted by the started announcement from inputting of the first symbol.

In accordance with another aspect of the present disclosure, there is provided a symbol input device, including: a display unit that (i) displays a correspondence table indicating correspondences between a plurality of input target symbols and a plurality of selection target symbols, the correspondence table indicating that each of the plurality of input target symbols corresponds to one or more selection target symbols different from each other among the plurality of selection target symbols, and (ii) ends the display of the correspondence table; a selector that prompts a user to select one of the plurality of selection target symbols included in the correspondence table displayed by the display unit after the display unit ends the display of the correspondence table; and a determiner that determines one input target symbol corresponding to the one of the plurality of selection target symbols selected by the user, the one input target symbol being indicated in the correspondence table displayed by the display unit.

According to the symbol input device configured as described above, display of the correspondence table is already ended when the user selects one of the selection target symbols.

With this configuration, for example, when the user is seen selecting one of the selection target symbols by a person, it is difficult for the person to know which input target symbol is determined as a symbol to be input.

Thus, according to the symbol input device configured as described above, the probability that input symbols are determined by other people can be reduced as compared to conventional cases.

These general and specific aspects may be implemented to a system, a method, an integrated circuit, a computer program, or a computer-readable recording medium such as a Compact Disc-Read Only Memory (CD-ROM), or may be any combination of them.

Hereinafter, certain exemplary embodiments of a symbol input device according to the present disclosure are described in greater detail. It should be noted that all the embodiments described below are generic and specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Embodiment

The following describes an embodiment with reference to FIGS. 1 to 10.

[1-1 Configuration]

In the present embodiment, a symbol input device according to the present disclosure is achieved by an on-board monitor in an on-board system provided to an aircraft.

The following describes the configuration of the on-board system with reference to FIGS. 1 to 5.

FIG. 1 is a diagram illustrating disposition of on-board monitors 200A to 200F provided in the aircraft in the embodiment. The aircraft includes a plurality of seats 400A to 400F on which passengers are to be seated. Seats 400A to 400F are collectively referred to as seats 400 in some cases. On-board monitors 200A to 200F are provided at predetermined positions on the back surfaces of the backs of seats 400A to 400F, respectively. On-board monitors 200A to 200F each have an identical configuration. On-board monitors 200A to 200F are collectively referred to as on-board monitors 200 in some cases. The passengers insert their own credit cards 300A to 300C into card readers (to be described later) of on-board monitors 200 and make payment. Credit cards 300A to 300C are collectively referred to as credit cards 300 in some cases.

As illustrated in FIG. 1, each on-board monitor 200 is installed at a position facing a passenger seated on seat 400 behind seat 400 on which on-board monitor 200 is mounted so that on-board monitor 200 can be visually recognized by the passenger. While being seated on seat 400, the passenger can buy a product displayed on on-board monitor 200 provided to front seat 400 by operating a touch panel (to be described later) of on-board monitor 200 and inserting credit card 300 into the card reader of on-board monitor 200.

Figure 2:
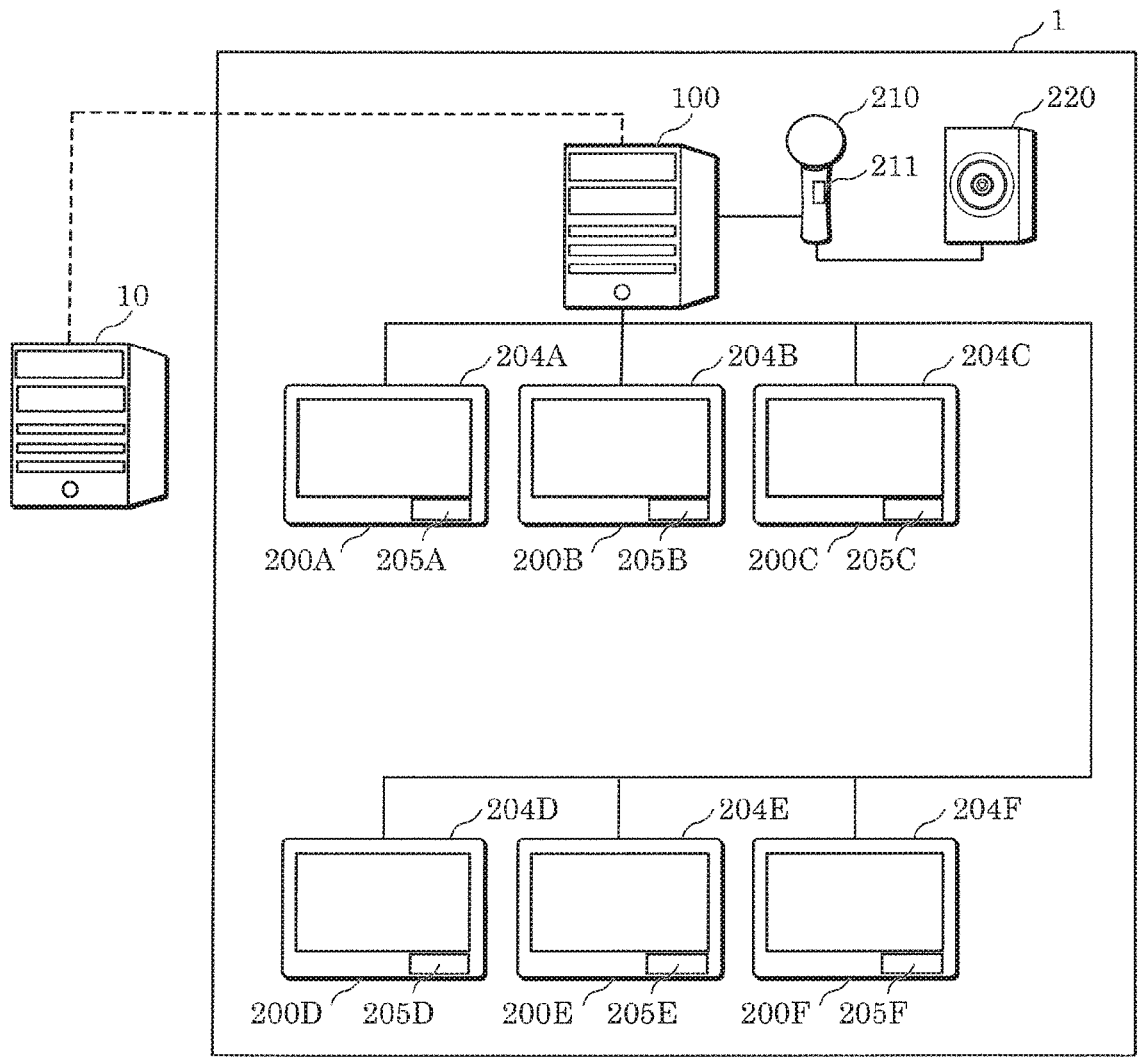
FIG. 2 is a block diagram illustrating the configuration of an on-board system according to the embodiment, and a server device of a credit card company that communicates with the on-board system.

FIG. 2 is a diagram illustrating the configuration of on-board system 1 and server device 10 of a credit card company that communicates with on-board system 1.

On-board monitors 200A to 200F include touch panels 204A to 204F and card readers 205A to 205F, respectively. Touch panels 204A to 204F are collectively referred to as touch panels 204 in some cases. Card readers 205A to 205F are collectively referred to as card readers 205 in some cases. Each on-board monitor 200 can perform playback of a content distributed from server device 100 and allow shopping of an on-board product.

On-board system 1 includes server device 100, the plurality of on-board monitors 200, on-board microphone 210, and on-board speaker 220. Server device 100 is connected with each on-board monitor 200 through a network cable, and performs bidirectional communication with on-board monitor 200, such as content distribution to on-board monitor 200 and acquisition of a communication connection status of on-board monitor 200. Information such as the communication connection status of on-board monitor 200 is collectively managed by server device 100. Server device 10 of the credit card company performs authentication between information of credit card 300 acquired through bidirectional communication with server device 100 by card reader 205 included in on-board monitor 200 and a password input through touch panel 204 by the passenger.

Each on-board monitor 200 is an exemplary input and output terminal. On-board monitor 200, which includes card reader 205, is also an exemplary password input device.

On-board microphone 210 includes operation button 211, and converts input voice into an electric signal and outputs the electric signal to on-board speaker 220 while operation button 211 is pressed down. On-board microphone 210 is connected with server device 100 through an electricity cable, and outputs a button-pressed-down signal indicating pressing down of operation button 211 to server device 100.

On-board speaker 220 converts the electric signal output from on-board microphone 210 into voice, and outputs the voice.

Figure 3:
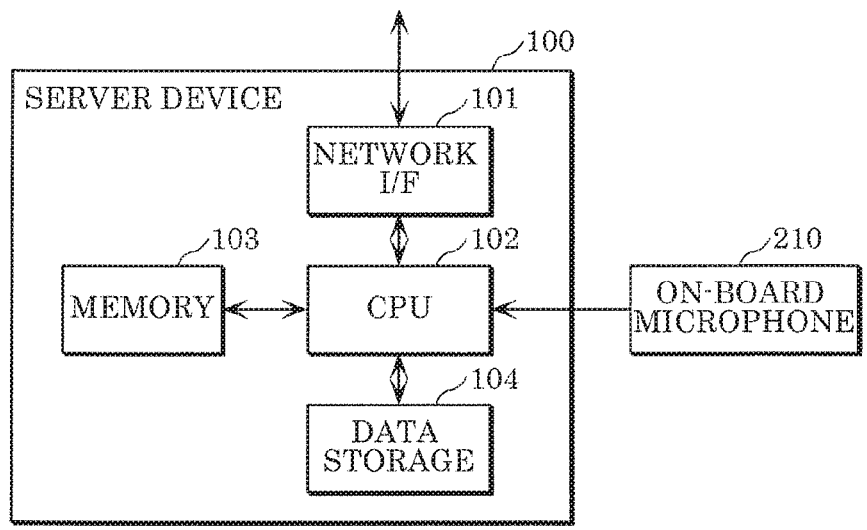
FIG. 3 is a block diagram illustrating the configuration of the server device according to the embodiment.

FIG. 3 is a block diagram illustrating the configuration of server device 100. Server device 100 includes network interface (I/F) 101, CPU 102, memory 103, and data storage 104.

Network interface 101 is an interface through which CPU 102 communicates with on-board monitor 200, and is also an interface through which CPU 102 communicates with server device 10 of the credit card company.

CPU 102 performs various calculation and information processing by executing computer programs stored in memory 103. CPU 102 can perform reading from and writing to memory 103 and data storage 104. CPU 102 performs communication with on-board monitor 200 and communication with server device 10 of the credit card company through network interface 101. CPU 102 performs control in accordance with a request from on-board monitor 200. CPU 102 receives the button-pressed-down signal output from on-board microphone 210.

Memory 103 stores the computer programs executed by CPU 102 and results of calculation by CPU 102. Memory 103 is, for example, a flash memory or a RAM.

Data storage 104 performs content and service provision to on-board monitor 200 through CPU 102 in response to a request from the passenger. Data storage 104 is, for example, a hard disk device.

Figure 4:
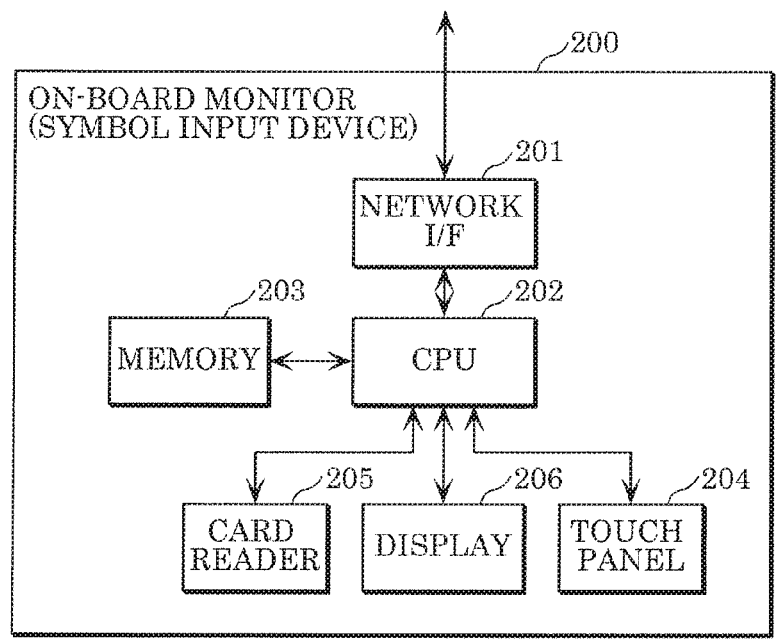
FIG. 4 is a block diagram illustrating the configuration of the on-board monitor according to the embodiment.

FIG. 4 is a block diagram illustrating the configuration of each on-board monitor 200. On-board monitor 200 includes network interface (I/F) 201, CPU 202, memory 203, touch panel 204, card reader 205, and display 206.

Network interface 201, CPU 202, and memory 203 are hardware same as network interface 101, CPU 102, and memory 103, respectively, included in server device 100.

Network interface 201 is an interface through which CPU 202 communicates with server device 100 through the network cable.

CPU 202 performs various calculation and information processing by executing computer programs stored in memory 203, and can perform reading from and writing to memory 203. CPU 202 performs communication with server device 100 through network interface 201. Memory 203 stores the computer programs executed by CPU 202 and results of calculation by CPU 202.

Touch panel 204 is disposed on the surface of display 206. When the passenger touches display on display 206, touch panel 204 transmits information indicating a touched position to CPU 202. CPU 202 performs control in accordance with the information to allow an intuitive operation by the passenger. Card reader 205 is a device that reads information of credit card 300. Upon reception of a command from CPU 202, card reader 205 starts and stops communication to transmit the credit card information to CPU 202. Display 206 displays various contents in accordance with a command from CPU 202.

On-board monitor 200 achieves various functions when CPU 202 executes computer programs stored in memory 203.

Figure 5:
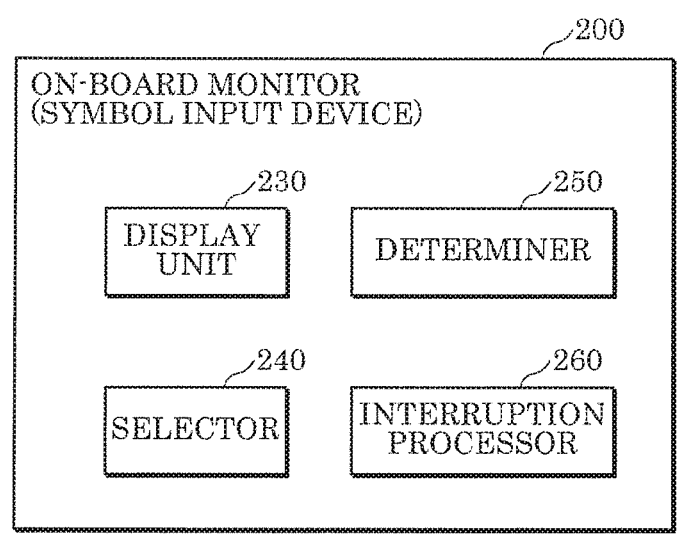
FIG. 5 is a block diagram illustrating the configuration of functions achieved by the on-board monitor according to the embodiment.

FIG. 5 is a block diagram illustrating the configuration of functions achieved by on-board monitor 200.

As illustrated in FIG. 5, on-board monitor 200 achieves functional blocks of display unit 230, selector 240, determiner 250, and interruption processor 260.

As an example, display unit 230 is achieved by CPU 202 executing a computer program stored in memory 203 to control operations of CPU 202, memory 203, and display 206.

As an example, selector 240 is achieved by CPU 202 executing a computer program stored in memory 203 to control operations of CPU 202, memory 203, touch panel 204, and display 206.

As an example, determiner 250 is achieved by CPU 202 executing a computer program stored in memory 203 to control operations of CPU 202 and memory 203.

As an example, interruption processor 260 is achieved by CPU 202 executing a computer program stored in memory 203 to control operations of CPU 202 and memory 203.

The operations performed by display unit 230, selector 240, determiner 250, and interruption processor 260 will be described later in the following section [1-2 Operation].

[1-2 Operation]

On-board system 1 executes, as characteristic operations, password input processing and interrupt processing.

The following describes the password input processing with reference to the accompanying drawings.

Figure 6:
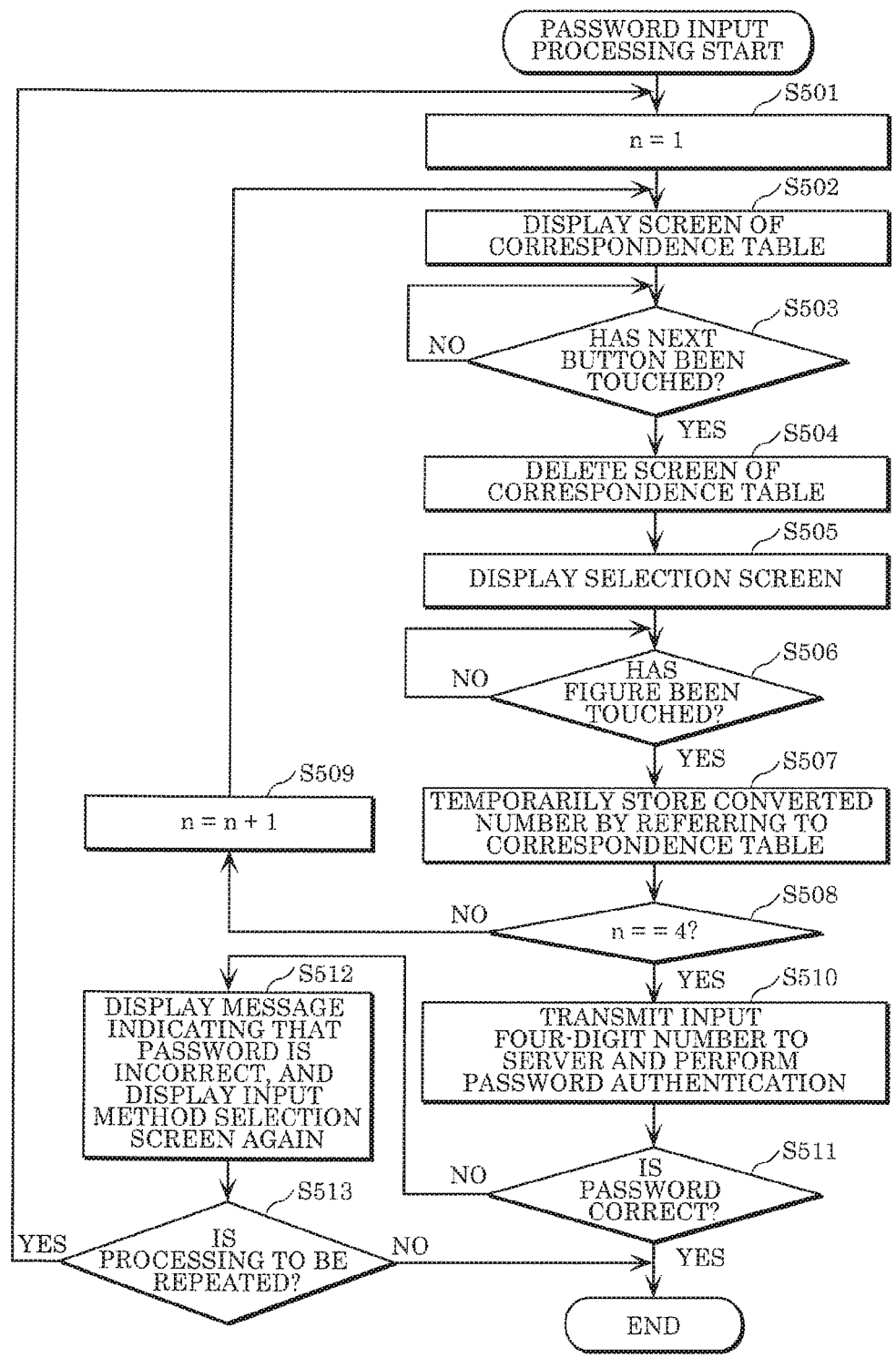
FIG. 6 is a flowchart of password input processing.

FIG. 6 is a flowchart of the password input processing.

The password input processing is started when credit card 300 is inserted into card reader 205. In this example, the password of credit card 300 is a four-digit.

When credit card 300 is inserted into card reader 205, CPU 202 of on-board monitor 200 transmits a password input request to CPU 102 of server device 100. CPU 102 of server device 100 provides the content (in this example, each figure illustrated in FIG. 7 to be described later) of a password input system stored in data storage 104 to CPU 202 of on-board monitor 200.

Having received the provided content, CPU 202 counts input number n from one to four (step S501).

Then, CPU 202 displays a correspondence table of the numbers of 0 to 9 and figures as the content transmitted from server device 100 on display 206 (step S502).

Figure 7:
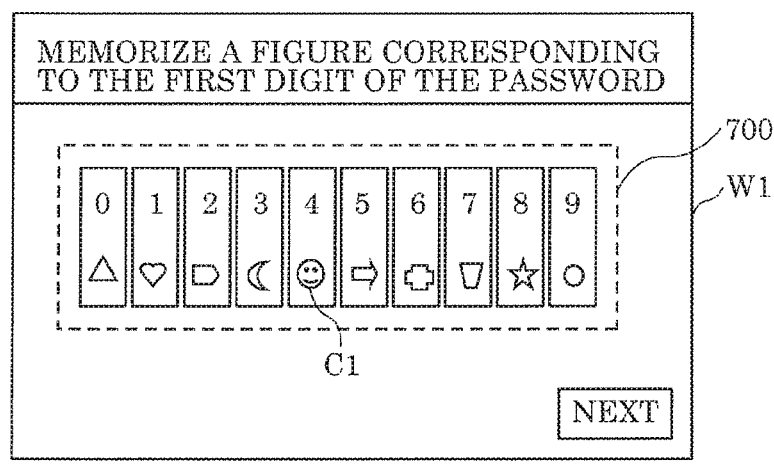
FIG. 7 is a pattern diagram illustrating an exemplary screen of a display that displays a correspondence table according to the embodiment.

FIG. 7 is a diagram illustrating exemplary screen W1 of display 206 displaying correspondence table 700.

As illustrated in FIG. 7, correspondence table 700 is a table listing the correspondence relation between the 10 numbers of 0 to 9 and 10 figures. CPU 202 determines, at random, combinations of 10 figures transmitted from server device 100 and 10 numbers, which are stored in memory 203 in advance. CPU 202 stores the determined combinations of the figures and the numbers in memory 203. CPU 202 displays the determined combinations in a format recognizable by the passenger. As illustrated in FIG. 7, correspondence table 700 lists each number and the figure corresponding to the number in a format with which the correspondence relation between the number and the figure can be visually recognized. CPU 202 displays a message "Memorize a figure corresponding to the first digit of the password" on display 206 together with correspondence table 700. In addition, CPU 202 displays a "Next" button on display 206 together with correspondence table 700.

Specifically, display unit 230 displays a correspondence table of a plurality of input target symbols and a plurality of selection target symbols (in this example, correspondence table 700), the correspondence table indicating that one or more selection target symbols different from each other (in this example, the 10 figures illustrated in FIG. 7) correspond to each input target symbol (in this example, the 10 numbers of 0 to 9).

When the screen illustrated in FIG. 7 is displayed on display 206, the passenger memorizes the figure corresponding to the first digit of a password. For example, the first digit of the password is four. Screen W1 displaying correspondence table 700 indicates that the figure corresponding to the number of four is a smile figure (C1). When having memorized the corresponding figure, the passenger touches the displayed "Next" button.

Subsequently, CPU 202 determines whether the passenger has touched the "Next" button (step S503). When having determined that the "Next" button has not been touched (No at step S503), CPU 202 repeats the processing at step S503. When having determined that the "Next" button has been touched (Yes at step S503), CPU 202 deletes the correspondence table from display 206 (step S504).

In other words, display unit 230 ends display of the correspondence table (in this example, correspondence table 700).

Subsequently, CPU 202 displays a selection screen on display 206 (step S505).

Figure 8:
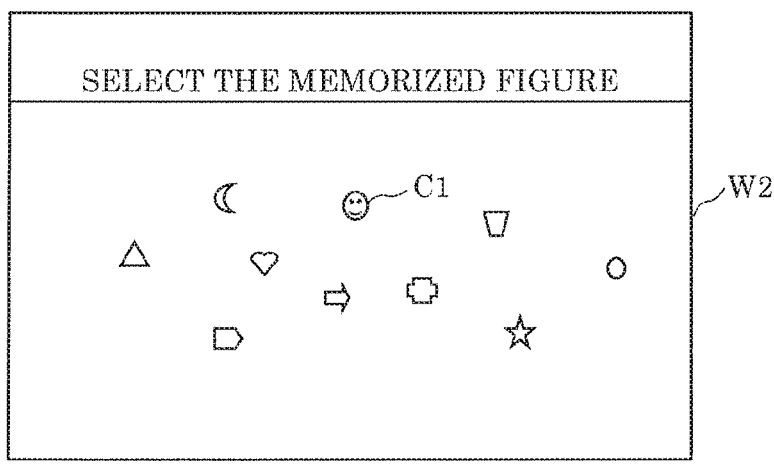
FIG. 8 is a pattern diagram illustrating an exemplary screen of the display that displays a selection screen according to the embodiment.

FIG. 8 is a diagram illustrating exemplary selection screen W2 displayed on display 206. CPU 202 disposes each figure included in correspondence table 700 illustrated in FIG. 7 at a random position, and displays the figure on display 206. In this case, CPU 202 displays only the figures on display 206, but does not display the numbers.

Specifically, display unit 230 displays each of the plurality of selection target symbols (in this example, the 10 figures illustrated in FIG. 7) included in the correspondence table (in this example, correspondence table 700).

Then, CPU 202 displays a message of "Select the memorized figure" together with the figures. The passenger memorizes the figure corresponding to the first digit of the password in FIG. 7, selects the memorized figure from among the figures in FIG. 8, and touches the selected figure on touch panel 204.

CPU 202 determines whether any of the figures has been touched from a result of detection by touch panel 204 (step S506). When having determined that none of the figures has been touched (No at step S506), CPU 202 repeats the processing at step S506.

Specifically, after display of the correspondence table (in this example, correspondence table 700) is ended, selector 240 prompts the user of the symbol input device (in this example, on-board monitor 200) to select one of the plurality of selection target symbols (in this example, the 10 figures illustrated in FIG. 7) included in the correspondence table (in this example, correspondence table 700) being displayed.

When having determined that any of the figures has been touched (Yes at step S506), CPU 202 refers to correspondence table 700 temporarily stored in memory 203, acquires the number corresponding to the selected figure, and stores the acquired number in memory 203 (step S507). For example, according to FIG. 7, the figure corresponding to the number of four is the smile figure (C1). When having determined that the smile figure (C1) has been touched while selection screen W2 is displayed on display 206, CPU 202 determines that the first digit of the password selected by the passenger is the number of four according to correspondence table 700 temporarily stored in memory 203, and temporarily stores the number of four in memory 203.

Specifically, determiner 250 determines, as a symbol to be input, one input target symbol (in this example, the number of four) indicated by the displayed correspondence table (in this example, correspondence table 700) and corresponding to the selection target symbol (in this example, the smile figure (C1)) selected by the user.

CPU 202 determines whether the input number has reached four. Specifically, CPU 202 determines whether input number n is equal to four (step S508). When having determined that input number n has not reached four, in other words, is not equal to four (No at step S508), CPU 202 adds one to input number n (step S509), and returns to step S502.

CPU 202 repeats the display illustrated FIGS. 7 and 8 on display 206 four times by repeating the processing at steps S502 to S507, thereby acquiring the four-digit password.

When having determined that the processing has been repeated four times, in other words, when having determined that input number n is equal to four (Yes at step S508), CPU 202 transmits the input four-digit number as the password to server device 10 of the credit card company and requests authentication (step S510). Specifically, CPU 202 of on-board monitor 200 transmits, to CPU 102 of server device 100, card information of credit card 300 acquired from card reader 205 and the password made of the four-digit number input by the passenger. CPU 102 of server device 100 transmits the card information and the password to server device 10 of the credit card company through network interface 101. Server device 10 of the credit card company performs authentication of the card information and the password. Server device 10 of the credit card company transmits a result of the authentication to CPU 102 of server device 100. CPU 102 of server device 100 transmits the authentication result to CPU 202 of on-board monitor 200.

When having determined that the authentication result indicates that the password is correct (Yes at step S511), CPU 202 ends the password input processing indicated by the flowchart in FIG. 6. When having determined that the authentication result indicates that the password is not correct (No at step S511), CPU 202 displays a message telling that the password is incorrect on display 206, and displays, on display 206 together with "Yes" and "No" buttons, a screen asking whether password inputting is performed again (step S512).

The passenger touches touch panel 204 to select any of the "Yes" and "No" buttons. When having determined that the "No" button has been touched from a result of detection by touch panel 204 (No at S513), CPU 202 ends the password input processing indicated by the flowchart in FIG. 6. When having determined that the "Yes" button has been touched from a result of detection by touch panel 204 (Yes at step S513), CPU 202 repeats the processing at step S501 and later.

The following describes the interrupt processing with reference to the accompanying drawings.

Figures 9, 10:
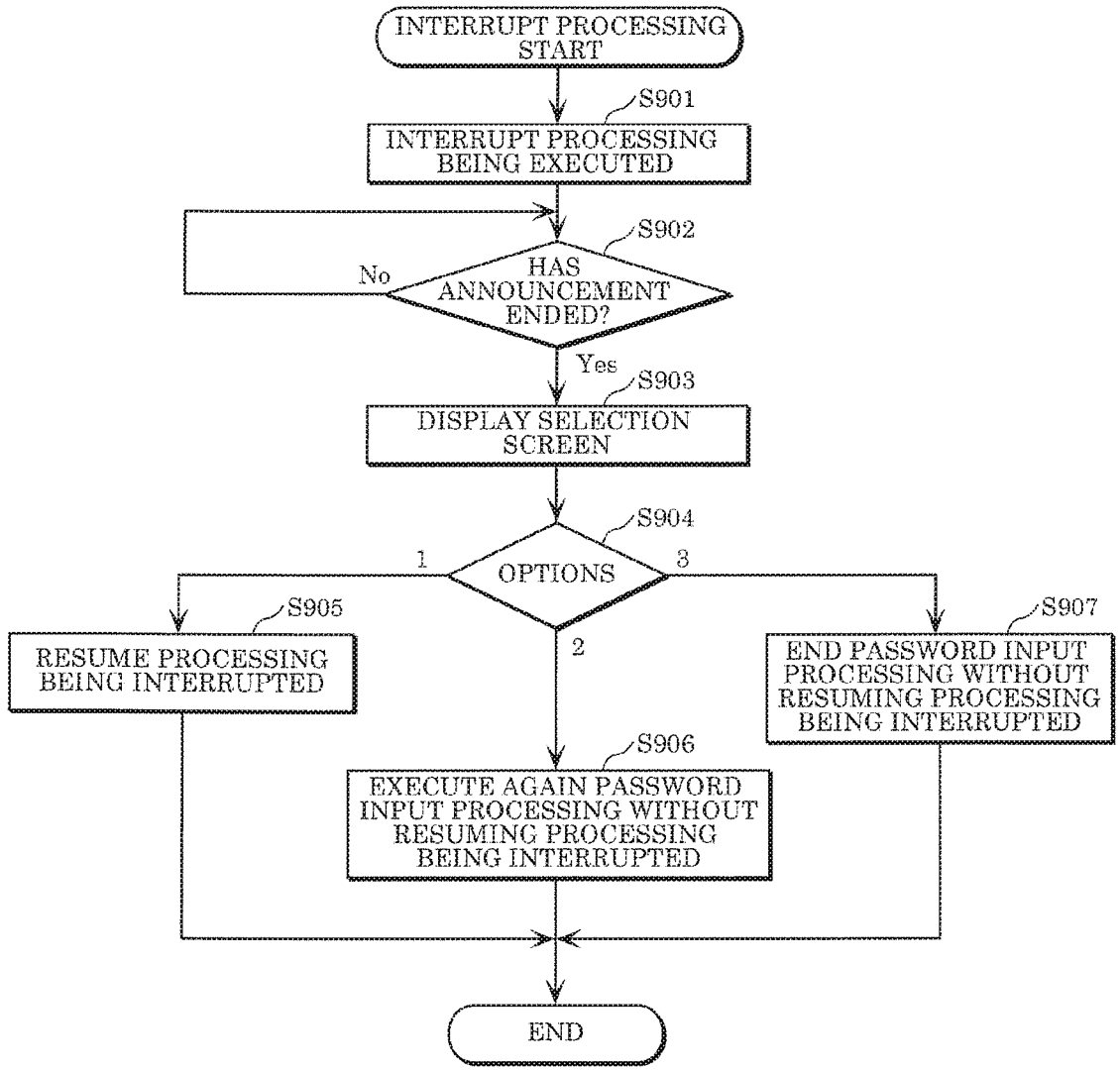
FIG. 9 is a flowchart of interrupt processing.
FIG. 10 is a pattern diagram illustrating an exemplary option screen according to the embodiment.

FIG. 9 is a flowchart of the interrupt processing.

The interrupt processing is started when operation button 211 of on-board microphone 210 is pressed down while on-board monitor 200 is executing processing related to the password input processing.

When operation button 211 of on-board microphone 210 is pressed down, inputting of a button-pressed-down signal indicating that output from on-board microphone 210 is to be started to CPU 102 of server device 100 is started. Then, CPU 102 outputs an announcement start signal indicating that on-board announcement has been started to CPU 202 of on-board monitor 200.

When the on-board announcement start signal has been output from CPU 102 of server device 100, CPU 202 interrupts the processing related to the password input processing being executed on on-board monitor 200 (step S901), and displays, on display 206, a message indicating that the on-board announcement is being broadcast.

Specifically, when announcement to passengers is started in the transport means (in this example, the aircraft) while the processing related to the password input processing is being executed, interruption processor 260 interrupts the processing being executed.

When the pressing down of operation button 211 of on-board microphone 210 ends, the inputting of the button-pressed-down signal output from on-board microphone 210 to CPU 102 of server device 100 ends. Then, CPU 102 outputs an announcement end signal indicating that the on-board announcement has been ended to CPU 202 of on-board monitor 200.

After having interrupted the processing related to the password input processing being executed, CPU 202 waits until the announcement end signal is output from CPU 102 of server device 100 (repeats No at step S902). Thereafter, when the announcement end signal has been output from CPU 102 of server device 100 (Yes at step S902), CPU 202 ends display of the message indicating that the on-board announcement is being broadcast, which is being displayed on display 206, and displays an option screen on display 206 (step S903).

FIG. 10 illustrates an exemplary selection screen displayed on display 206.

This option screen displays options for how the processing being currently interrupted is to be handled.

In the example illustrated in FIG. 10, CPU 202 displays three options of "1. Continue password inputting", "2. Repeat from the start", and "3. End".

CPU 202 detects that the passenger has touched touch panel 204, and proceeds processing in accordance with a selected item (step S904).

When having determined that "1. Continue password inputting" has been selected ("1" at step S904), CPU 202 resumes the processing being interrupted (step S905).

Specifically, when a predetermined condition is satisfied (in this example, when "1. Continue password inputting" is selected), interruption processor 260 resumes the processing being interrupted.

When having determined that "2. Repeat from the start" has been selected ("2" at step S904), CPU 202 does not resume the processing being interrupted but executes the password input processing from the start again (in other words, from the processing at step S501 in the flowchart of "the password input processing" illustrated in FIG. 6) (step S906).

When having determined that "3. End" has been selected ("3" at step S904), CPU 202 does not resume the processing being interrupted but ends the password input processing (step S907).

(Variations)

The embodiment is described above as an exemplary technology disclosed in the present application. However, the technology of the present disclosure is not limited to the embodiment but is also applicable to an embodiment provided with change, replacement, addition, omission, and the like as appropriate.

(1) In the embodiment, each of the plurality of input target symbols is not necessarily limited to one numeric character. Each of the plurality of input target symbols may be, for example, one alphabetical character or one Kana character. Alternatively, each of the plurality of input target symbols may be, for example, a number of a plurality of digits, or a word made of a plurality of alphabets. In addition, each of the plurality of input target symbols may be any of symbols (for example, map symbols and arrows) and figures (for example, circles, triangles, and rectangles) different from each other. The symbols, figures, and the like different from each other include symbols, figures, and the like having identical outer shapes but having colors different from each other.

In the embodiment, each of the plurality of selection target symbols is not necessarily limited to a figure listed in correspondence table 700. Similarly to the case of each of the plurality of input target symbols, each of the plurality of selection target symbols may be any of symbols and figures different from each other.

To avoid confusion of the user, the kind of each of the plurality of selection target symbols is desirably not same as the kind of each of the plurality of input target symbols.

For example, when each of the plurality of input target symbols is any of one numeric character and one alphabetical character, each of the plurality of selection target symbols is desirably any of symbols, figures, and the like other than the one numeric character and the one alphabetical character.

However, the condition that the kind of each of the plurality of selection target symbols is not same as the kind of each of the plurality of input target symbols is not essential.

(2) As exemplarily described in the embodiment, each symbol input by the user does not necessarily need to be a digit of the personal identification number of a credit card, and the number of symbols input by the user does not necessarily need to be four.

(3) In the embodiment, part of the processing performed by CPU 102 may be performed by CPU 202, and part of the processing performed by CPU 202 may be performed by CPU 102.

(4) In the embodiment, correspondence table 700 is an exemplary correspondence table indicating one-to-one correspondence between the plurality of input target symbols (in this example, the 10 numbers of 0 to 9) and the plurality of selection target symbols (in this example, the 10 figures illustrated in FIG. 7) different from each other. However, as another example, correspondence table 700 may be a correspondence table indicating one-to-many correspondence between the plurality of input target symbols and the plurality of selection target symbols different from each other.

The probability that an input symbol is determined by other people can be further reduced by a symbol input method using a correspondence table for one-to-many correspondence than by a symbol input method using a correspondence table for one-to-one correspondence.

(5) In the embodiment, screen W1 illustrated in FIG. 7 may display which digit of the password is being currently input, and selection screen W2 illustrated in FIG. 8 may display which digit of the password is being currently input.

(6) In the embodiment, other options may be included in the processing at step S904 of the interrupt processing illustrated in FIG. 9. Examples of the other options include an option that, when inputting of K (K is an integer equal to or larger than one and smaller than N; in this example, K is any of one to three) numbers is already completed among a password made of N (N is an integer equal to or larger than two; in this example, N is four) numbers, the password inputting is resumed from inputting of the (K+1)-th number (specifically, execution is repeated with n=K+1 from the processing at step S502 in the flowchart of "the password input processing" illustrated in FIG. 6) without resuming the processing being interrupted.

(7) In the embodiment, a device that receives inputting of an operation from the user does not necessarily need to be touch panel 204. For example, a device such as a remote controller, a keyboard, or a mouse may be employed in place of touch panel 204.

(8) In the embodiment, on-board system 1 does not necessarily need to be provided to an aircraft. For example, on-board system 1 may be provided to a transport means such as a train or a bus. Alternatively, on-board system 1 may be provided to a facility such as a classroom of a school other than a transport means.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is widely applicable to a symbol input device for inputting symbols such as numbers and characters.

What is claimed is:

1. A symbol input method performed by a symbol input device, the symbol input device including a display unit, a selector, and a determiner, the symbol input method comprising:
   displaying, by the display unit, a correspondence table indicating correspondences between a plurality of input target symbols and a plurality of selection target symbols, the correspondence table indicating that each of the plurality of input target symbols corresponds to one or more selection target symbols different from each other among the plurality of selection target symbols;
   ending, by the display unit, the display of the correspondence table;
   prompting, by the selector, after the ending, a user of the symbol input device to select one of the plurality of selection target symbols included in the correspondence table displayed in the displaying; and
   determining, by the determiner, one input target symbol as a symbol to be input, the one input target symbol being indicated in the correspondence table displayed in the displaying and corresponding to the one of the plurality of selection target symbols selected by the user in the prompting,
   wherein
   the displaying, the ending, the prompting, and the determining are repetitively executed N times to determine N symbols to be input, where N is an integer equal to or larger than two, and
   in the displaying, the correspondence table so that the correspondence tables between which the correspondences are not neccessarily identical are displayed at the repetitive executions in the displaying.

2. The symbol input method according to claim 1, wherein the prompting includes, displaying, by the display unit, each of the plurality of selection target symbols included in the correspondence table displayed in the displaying.

3. The symbol input method according to claim 1, wherein each of the plurality of input target symbols is any of one numeric character and one alphabetical character, and each of the plurality of selection target symbols is a figure other than a numeric character and an alphabetical character.

4. The symbol input method according to claim 1, wherein the symbol input device is disposed in a transport means that transports a passenger,
the symbol input device further includes an interruption processor, and
the symbol input method further comprises:
interrupting, by the interruption processor, at least one of the displaying, the ending, the prompting, and the determining, when announcement for the passenger is to be started in the transport means while the at least one of the displaying, the ending, the prompting, and the determining is being executed by the symbol input device.

5. The symbol input method according to claim 4, further comprising:
resuming, by the interruption processor, the at least one of the displaying, the ending, the prompting, and the determining interrupted in the interrupting and being interrupted, when a predetermined condition is satisfied.

6. The symbol input method according to claim 4, further comprising:
in a case where the displaying, the ending, the prompting, and the determining are scheduled to be repetitively executed N times in the symbol input device and the repetitive execution is completed up to a K-th execution, where N is an integer equal to or larger than two and K is an integer equal to or larger than one and smaller than N,
when the predetermined condition is satisfied in the interrupting by the interruption processor,
resuming, by the interruption processor, the repetitive execution from start of a (K+1)-th execution in the repetitive execution.

7. The symbol input method according to claim 4, further comprising:
in a case where the displaying, the ending, the prompting, and the determining are scheduled to be repetitively executed N times in the symbol input device and the repetitive execution is completed up to a K-th execution, where N is an integer equal to or larger than two and K is an integer equal to or larger than one and smaller than N,
when the predetermined condition is satisfied in the interrupting by the interruption processor,
resuming, by the interruption processor, the repetitive execution from start of a first execution among the repetitive execution.

8. A symbol input device, comprising:
a display device including circuitry that (i) displays a correspondence table indicating correspondences between a plurality of input target symbols and a plurality of selection target symbols, the correspondence table indicating that each of the plurality of input target symbols corresponds to one or more selection target symbols different from each other among the plurality of selection target symbols, and (ii) ends the display of the correspondence table;
a selector that prompts a user to select one of the plurality of selection target symbols included in the correspondence table displayed by the display device after the display device ends the display of the correspondence table; and
a determiner that determines one input target symbol corresponding to the one of the plurality of selection target symbols selected by the user, the one input target symbol being indicated in the correspondence table displayed by the display device,
wherein
the displaying of the correspondence table, the ending of the displaying of the correspondence table, the prompting by the selector, and the determining by the determiner are repetitively executed N times to determine N symbols to be input, where N is an integer equal to or larger than two, and
in the displaying, the correspondence table so that the correspondence tables between which the correspondences are not neccessarily identical are displayed at the repetitive executions in the displaying.

* * * * *